United States Patent [19]
Schroff

[11] 3,977,182
[45] Aug. 31, 1976

[54] GAS TURBINE CONTROL
[75] Inventor: Dennis E. Schroff, Indianapolis, Ind.
[73] Assignee: General Motors Corporation, Detroit, Mich.
[22] Filed: June 20, 1975
[21] Appl. No.: 588,696

[52] U.S. Cl. .................. 60/39.27; 60/39.28 R; 60/39.29
[51] Int. Cl.² .................. F02C 9/08; F02C 9/14
[58] Field of Search ..... 60/39.27, 39.28 R, 39.28 T, 60/39.29

[56] References Cited
UNITED STATES PATENTS

| | | | |
|---|---|---|---|
| 3,533,238 | 10/1970 | Marvin | 60/39.29 X |
| 3,919,838 | 11/1975 | Armstrong | 60/39.29 X |
| 3,921,390 | 11/1975 | Stoltman | 60/39.29 X |

Primary Examiner—Clarence R. Gordon
Attorney, Agent, or Firm—Paul Fitzpatrick

[57] ABSTRACT
A fuel and burner variable geometry (BVG) control for a gas turbine engine. Fuel is controlled in response to the product of desired overall fuel-air ratio and a value of air flow derived from gas generator turbine speed. The desired fuel-air ratio is controlled by a speed governor, and by acceleration and deceleration limits varied as a function of measured burner inlet temperature. A compensated turbine inlet temperature (TIT) signal is derived from measurement of actual turbine inlet temperature and acceleration or deceleration compensation based upon rate of change of the desired fuel-air ratio. The difference between the compensated TIT and the burner inlet temperature (BIT) is the burner temperature rise.

The setting of air flow control devices in the combustion apparatus (BVG) determines the ratio of primary to total air. The desired ratio to control BVG is computed by dividing burner temperature rise by flame temperature rise. Flame temperature rise is the difference between the desired flame temperature and the measured BIT. The desired flame temperature is scheduled as a function of BIT and BVG. The ratio of primary to total air may be limited temporarily during starting of the engine.

6 Claims, 3 Drawing Figures

GAS TURBINE CONTROL

My invention relates to controls for gas turbine engines in which the combustion apparatus includes means, commonly called burner variable geometry or BVG, to vary the ratio of primary or combustion air to the total air flow through the combustion apparatus. My system includes means for controlling fuel flow as well as means for controlling BVG. A system according to my invention is particularly adapted to the requirements of gas turbine engines which include a freely rotating gas generator which delivers motive fluid to a power turbine which drives a load.

My control is adapted to control fuel flow ($W_f$) and BVG in response to a controlling input of desired engine power output (specifically as gas generator speed) and measurements of gas generator speed, burner inlet temperature (BIT), and turbine inlet temperature (TIT) of the engine. It is adapted to control flame temperature so as to minimize production of undesired products of combustion such as oxides of nitrogen and incompletely burned hydrocarbon.

The nature of a control system according to my invention may be appreciated from the following outline of the preferred embodiment. Air flow through the gas generator is determined as a function of measured gas generator speed. The fuel supplied to the engine is controlled by multiplying this air flow signal by a signal of desired fuel-air ratio. The fuel-air ratio signal is based primarily upon a control input of desired gas generator speed which coacts with a gas generator speed signal to govern gas generator speed. In addition, the desired fuel-air ratio has maximum and minimum limits which are functions of BIT and which are provided to assure clean combustion and avoid lean blowouts, among other objectives.

A value of compensated TIT is derived from corrected measured TIT and compensations for gas generator speed transients. Specifically, these transients are represented by functions of rate of change of the desired fuel-air ratio during acceleration or deceleration of the gas generator. The temperature rise across the burner is determined by subtracting the measured BIT from the compensated TIT signal. The ratio of primary to total air flow is determined from the burner temperature rise and the temperature rise in the flame or combustion zone of the burner. The latter is a function of BIT and BVG. BVG is a function of the desired ratio of primary (combustion) to total air flow. The BVG signal controls an actuator to vary the configuration of the burner.

A feature of the invention is that combustion zone temperature, which is the large controlling factor in the generation of undesired combustion products, is controlled independently of the burner outlet temperature (TIT) by varying the burner geometry. Another feature is that control of the burner geometry is effected by measurement of TIT and BIT. Among the advantageous results of the control are that no ambient temperature compensation is required and likewise no warm-up compensation during start of the engine. Also, direct measurement of flame temperature is avoided.

The principal objects of my invention are to improve the performance of gas turbine engines, particularly the emission characteristics of such engines, to provide a simple adequate control for the burner variable geometry of gas turbine engines, and to provide fuel and burner variable geometry controls which are responsive to inputs of gas generator actual and requested speeds, burner inlet temperature, and burner outlet temperature.

The nature of my invention and its advantages will be more fully apparent from the succeeding detailed description of the preferred embodiment of the invention and the accompanying drawings thereof.

Figure 1:
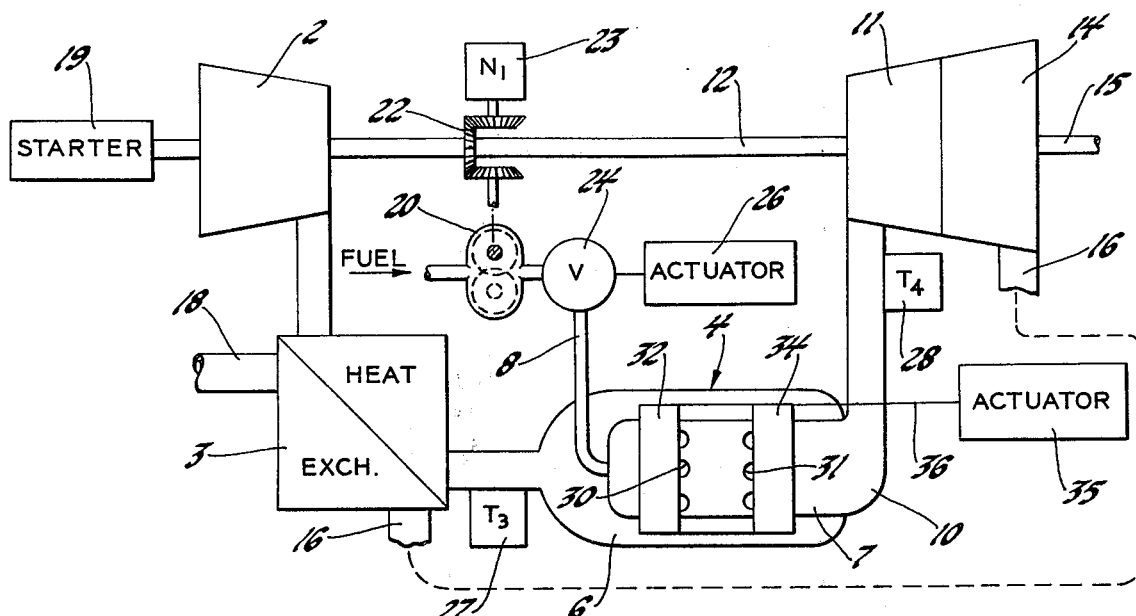
FIG. 1 is a schematic diagram of a regenerative gas-coupled gas turbine engine with burner variable geometry.

FIG. 1 illustrates a well known type of gas turbine engine. The engine includes a compressor 2 which takes in atmospheric air and delivers it through one pass of a heat exchanger 3 (a regenerator or recuperator) to a combustion apparatus or burner 4. The combustion apparatus includes the usual housing or outer case 6 which receives the compressed air and a combustion liner 7. Fuel is supplied to the combustion liner through a fuel line 8. The fuel is burned in the air within the liner and the combustion products are delivered through a duct 10 into a turbine 11 to provide motive fluid for the turbine. The turbine 11 is coupled through a shaft 12 to the compressor to drive the compressor. The portions of the engine thus far described constitute a gas generator. The hot gases exhausted from the gas generator provide motive fluid for an independently rotatable power turbine 14. It will be realized that these turbines may be coupled together by power transfer means such as those described in Flanigan et al U.S. Pat. No. 3,237,404 granted Mar. 1, 1966. Turbine 14 drives a power output shaft 15 which may be connected through a suitable transmission to the driven load which may, for example, be the road wheels of a vehicle. The transmission or load may limit the speed of turbine –, or it may be otherwise limited. The exhaust from turbine 14 is led through a duct 16 and the other pass of heat exchanger 3 to an exhaust pipe 18. The engine may be started by cranking the gas generator by any suitable starter 19.

Fuel is supplied to the combustion apparatus from any suitable source, ordinarily by a pump driven by the engine, as illustrated. Pump 20 is driven by a power takeoff drive 22 from shaft 12, although it could be otherwise driven. The power takeoff drive also drives a gas generator speed transmitter or $N_1$ sensor 23. As illustrated, pump 20 supplies fuel through a throttling or flow controlling metering valve 24 into line 8. The rate of flow through valve 24 is controlled by a suitable actuator 26 which is preferably electrically controlled.

Those skilled in the art will recognize that fuel controls for a gas turbine engine may include other elements not shown here, particularly a head regulating by-pass valve which by-passes excess pump discharge to the pump inlet under such control as to maintain a constant pressure drop across the metering valve 24.

The temperature of the air entering the combustion apparatus, identified as $T_3$ or BIT, is measured by a suitable thermocouple or other sensor 27. The temperature of the motive fluid delivered to the turbine, identified as turbine inlet temperature or $T_4$, is measured by a thermocouple or the like 28 mounted on duct 10.

The combustion apparatus 4 is of a variable geometry type, as illustrated schematically. The fuel entering from line 8 is atomized or evaporated and burned in the upstream end of the liner 7. Primary or combustion air is supplied near the upstream end of the liner through ports 30. Dilution air (the remainder of total air) is supplied near the downstream end of the liner through ports 31. The areas of these ports are varied by sleeves 32 and 34 reciprocable along the combustion liner so as to vary reversely the area of ports 30 and 31, or by other suitable means. As illustrated, sleeves 32 and 34 are connected together and to an actuator 35 through the pull rod 36. For those interested in the details of a combustion apparatus suitable for an engine of the type described here, reference may be made to Anderson et al U.S. Pat. No. 3,859,787 issued Jan. 14, 1975. This patent describes the operation of a combustion chamber including variable geometry to control the flow of primary and secondary air. Obviously, the ratio of primary air to total air flow is a function of the position of the sleeves and may be readily determined for any particular configuration of combustion apparatus. The ports may be configured to provide a desired or suitable range and curve of the ratio of primary to total air flow as a function of the position of the actuating rod 36.

It will be clear to those skilled in the art that the temperature rise in the combustion apparatus; that is, the difference between temperature of the air entering the combustion apparatus and that entering the turbine is a direct function of the ratio of fuel to air. Thus, TIT is a direct function of this ratio plus BIT. The temperature rise from BIT to temperature in the combustion zone of the burner (flame temperature) is a direct function of the ratio of fuel to primary air. Obviously, flame temperature will be the sum of this temperature rise and BIT.

It follows from this that the ratio of primary air to total air equals the ratio of (TIT minus BIT) to (flame temperature minus BIT). This relation is used as a basis for my system of control. It is well known to those skilled in the art that too high flame temperatures lead to production of undesired amounts of nitrogen oxides. On the other hand, too low flame temperatures are likely to lead to delivery of such pollutants as carbon monoxide and other unburned hydrocarbon products. Also, too high a flame temperature may damage the flame tube walls and too low a combustion temperature leads to unstable combustion and difficulty with flameouts of the combustor, particularly during deceleration. These relations are illustrated for a typical combustor by the curves of FIG. 2.

Figure 2:
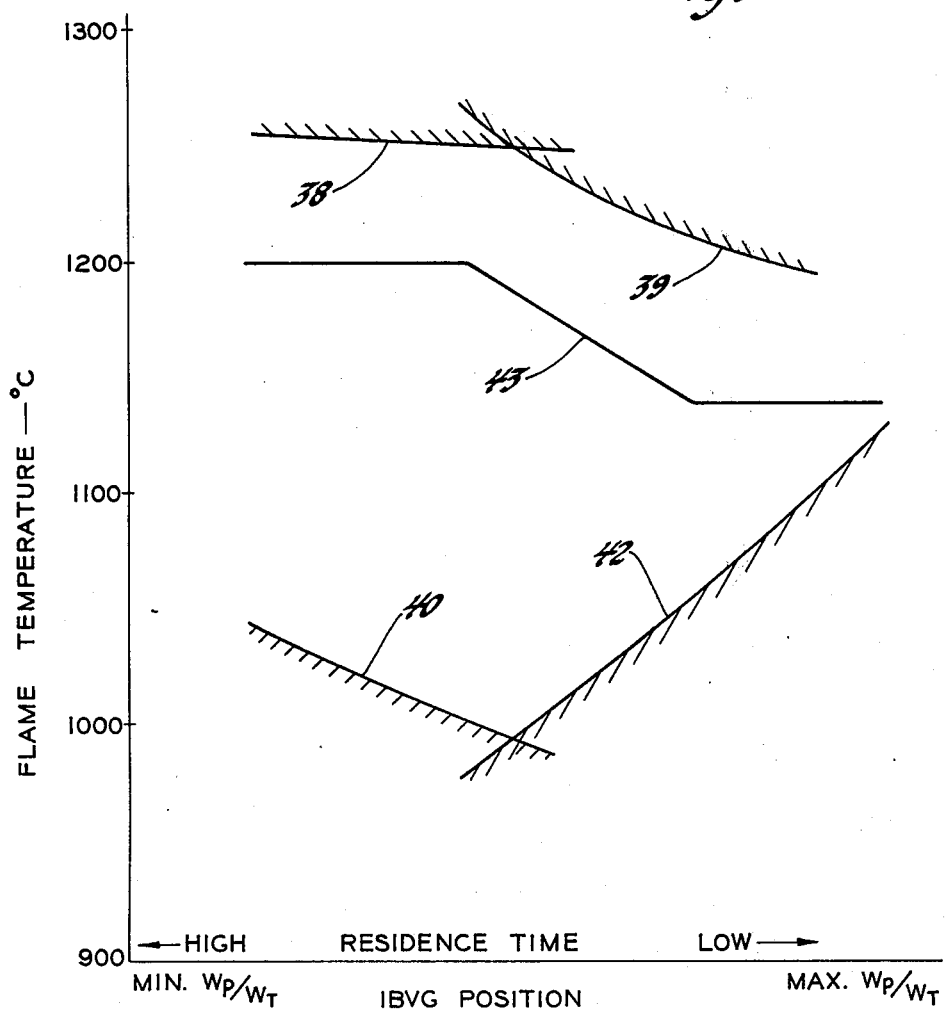
FIG. 2 is a plot illustrating factors involved in scheduling flame temperature as a function of burner variable geometry.

The abscissa in FIG. 2 is BVG position with ratio of primary to total air increasing from left to right on the diagram. Ratio of primary to total air is approximately a linear function of burner variable geometry in the particular apparatus under discussion here. The ordinate is flame temperature. It may be also pointed out that the low BVG position; in other words, low ratio of primary to total air flow is attended by high residence time in the flame zone, and with increasing primary air flow the residence time decreases. Production of undesired nitrogen oxides is a function of residence time as well as temperature, tending to increase with both. On the other hand, increasing residence time tends to minimize incomplete combustion.

In FIG. 2, the shaded line 38 illustrates an upper limit to flame temperature based upon undue production of nitrogen oxide. The shaded line 39 is a limit imposed to avoid unduly high combustion liner wall temperature. The shaded line 40 represents a lower limit of flame temperature below which flameout is likely, otherwise known as the lean blowout limit. A fourth line 42 represents combustion conditions which lead to undesired levels of carbon monoxide in the combustion products. It will be seen that a suitable zone for combustion lies between these lines and, of course, that the actual combustion conditions may be varied to some extent to achieve the most desirable overall performance in terms of clean combustion and responsive performance of the gas turbine engine.

The line 43 on FIG. 2 represents a preferred control schedule of flame temperature for a particular engine. In this case the control of variable geometry is scheduled so as to provide a flame temperature of approximately 1200°C. through about the first third of the schedule with increasing ratio of primary to total air, then a gradual decrease to about 1140°C. through approximately another third of the curve, and then control to give 1140°C. flame temperature in the higher power operation of the engine. It should be understood that these refer to flame temperature and not to burner discharge temperature (TIT).

Figure 3:
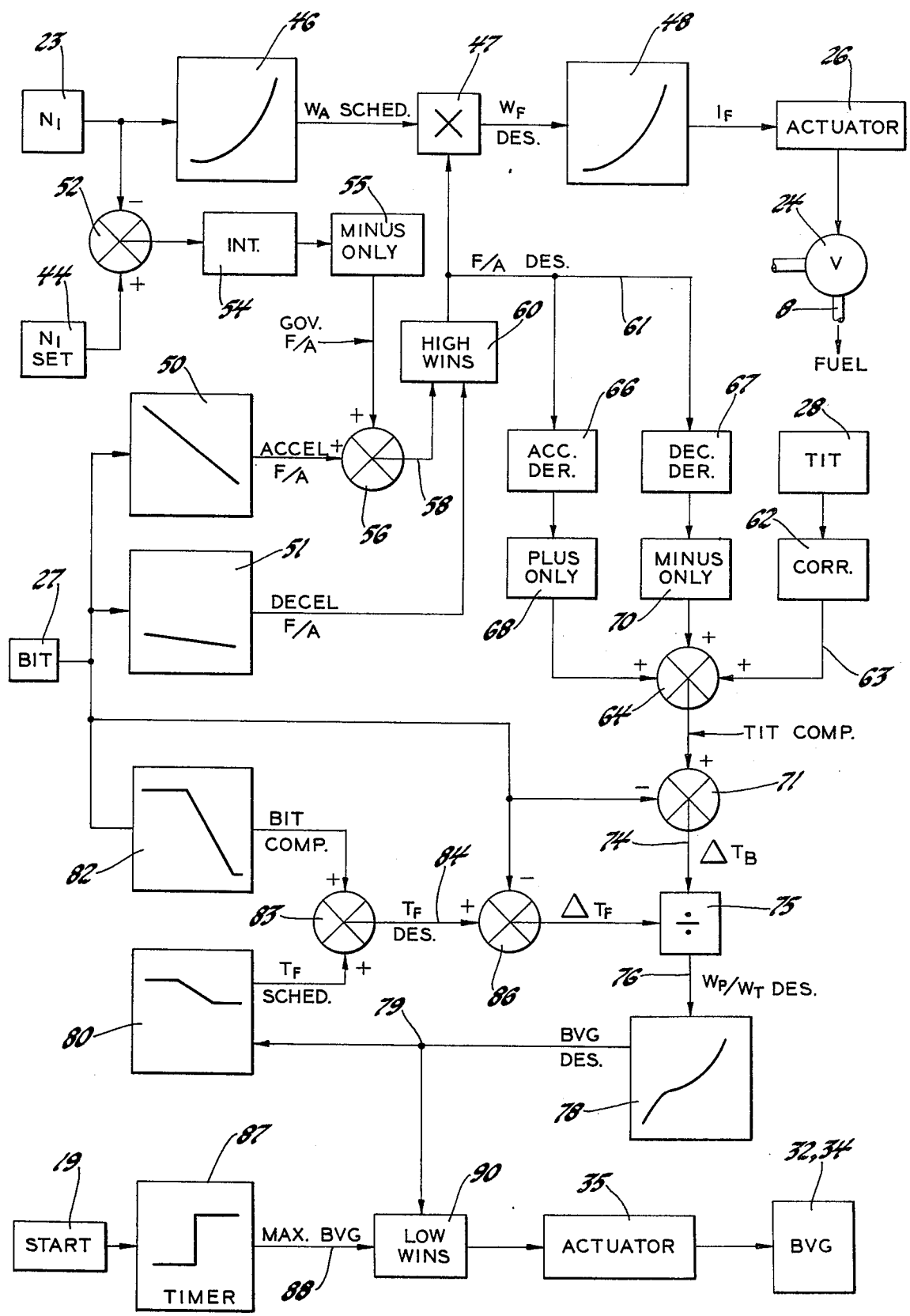
FIG. 3 is a schematic diagram of a control system for an engine such as that shown in FIG. 1.

With this introduction, we proceed to discussion of organization of the preferred control system as set out in FIG. 3 where it will be noted the $N_1$ transducer 23, BIT transducer 27, TIT transducer 28, fuel metering valve 24, actuator 26, BVG 32, 34, and actuator 35 are indicated schematically. In addition to the inputs representing conditions in the engine, a speed setting or governor setting device is represented by the element 44 bearing the legend in $N_1$ set which may, of course, be a throttle lever or accelerator pedal to control the speed of the gas generator and thus engine power level.

The schematic of FIG. 3 may be taken to represent an electrical or electronic system in which signals are represented by currents or voltages or other electrical quantity or to represent a mechanical, hydromechanical, or other system so long as the system contains elements which can perform the analog calculator functions described in the succeeding text. For various reasons such as economy and compactness, electronic circuit computing and function generating units are preferred for the engine control. Such systems include function generators which act as equivalents of cams to generate an output of particular desired function of an input. They include various types of gates, multiplying and dividing circuits, adding circuits, and circuits for generating integral and differential signals or mixtures of these for stabilization or compensating purposes. We will not enter into description of the details of such known elements of control systems, since it is not necessary for understanding the invention or for practice of the invention by those skilled in the art.

As shown in FIG. 3, the gas generator speed signal from transducer 23 is fed to a function generator 46 which develops an output signal representing the scheduled weight of air delivered in unit time by the compressor for the particular rotational speed. The approximate shape of this curve is indicated on the schematic. The scheduled weight of air signal is transmitted to a multiplier 47 where it is multiplied by a signal of a desired ratio of fuel to air by weight. The product is the desired weight of fuel flow in unit time. This signal is transmitted to a function generator 48 which may include a driver for the actuator 26 and which develops an output current $I_F$ which, having regard to the characteristics of the actuator and of valve 24, will provide the rate of fuel flow called for by the input signal to the function generator 48.

This brings us to the matter of generation of the desired fuel-air ratio signal, which is the other input to multiplier 47. A function generator 50 generates a signal of acceleration fuel-air ratio (maximum acceptable fuel-air ratio) based upon an input of BIT from sensor 27. A second function generator 51 generates a signal of deceleration fuel-air ratio (minimum fuel-air ratio to skirt lean blowouts) likewise based on the input of BIT. Both these fuel-air ratios decrease as BIT increases. These serve to compensate for ambient temperature and for temperature rise in the compressor and regenerator.

The third input to determine fuel-air ratio is from a gas generator governor which controls engine speed by controlling fuel-air ratio and therefore fuel supply during steady state operation. The governor circuit responds to an input of desired gas generator speed from the operator control 44 which is fed as a positive input into an adding device 52 and the input of gas generator speed from the tachometer 23 which is fed to the adding device as a minus signal. The output of adder 52 is thus proportional to the speed error and is positive if gas generator speed is below the request and negative if it is above. This signal is fed to an integrator 54. The integrator puts some lag into the signal to stabilize the governing function and to slow the rate of fuel change in response to changes in speed request so as to promote proper operation of the BVG control. A signal is transmitted from the integrator 54 through a minus only gate 55 as a governor fuel-air ratio signal to another adding device 56 where this signal is added to the acceleration fuel-air signal. Since the governor signal is negative, it is subtracted from the acceleration fuel-air signal to provide a signal on a channel 58 into a High Wins gate 60. Assuming that the engine is running and an increase in speed is called for, the governor fuel-air ratio signal becomes zero. The signal on channel 58 therefore will equal the maximum fuel-air or acceleration fuel-air for the particular burner inlet temperature. Acceleration of the gas generator will ultimately bring $N_1$ up to and above the level of the request, at which point a negative signal is fed through the governor fuel-air ratio channel into the adding device 56. This signal reduces the signal on line 58 progressively until the fuel-air ratio is such as to hold the gas generator speed at the requested value.

If the speed signal from input 44 is decreased, the result is an overspeed signal from the governor which progressively reduces the signal on channel 58 into the High Wins gate 60. Fuel thus decreases at a rate determined by the constants of the integrating circuit 54 until the signal on channel 58 becomes less than the deceleration fuel-air ratio signal on channel 59 fed into the High Wins gate 60. The output of the High Wins gate thus cannot drop below the deceleration fuel-air ratio signal. When the speed drops to the requested value, the governor again takes over and establishes a fuel rate between the acceleration and deceleration limits.

This concludes the description of the mode of controlling fuel flow to the engine. As will be seen, the fuel flow is determined by a speed request from the gas generator speed setting input 44 and measurements of the two parameters of gas generator speed and burner inlet temperature.

Proceeding now to the control of burner variable geometry (BVG), this is determined as a function of the BIT signal, the TIT signal, and the desired fuel-air ratio signal the generation of which has just been described. The controls do not depend directly upon the measurement of TIT, but rather upon a compensated TIT signal the generation of which is as follows: The signal of TIT from the thermocouple 28 is fed to a correcting circuit 62 which essentially adds a derivative term so as to correct for the time lag of the thermocouple. Such correcting circuits are well known and need not be described at this point.

The corrected signal of measured TIT is fed through a channel 63 into an adding device or circuit 64. Here the signal is compensated to provide the compensated TIT signal from which BIT is subtracted to determine the signal of $\Delta T_B$ or burner temperature rise. The compensation involves additional inputs which reflect the effect of transients during acceleration and deceleration of the gas generator. The desired fuel-air signal from channel 61 is supplied to two derivative circuits or devices 66 and 67 which generate signals which are primarily derivatives of the fuel-air signal and thus have magnitude increasing with the rate of change of desired fuel-air. The reason for having two such circuits is that the compensation during acceleration is different from that during deceleration in the particular installation described here. The output of derivative circuit 66 is fed through a plus only gate 68 and the signal from derivative device 67 through a minus only gate 70 as positive inputs to the adder 64. The gates 68 and 70 assure that the signal from derivative circuit 66 does not reach the adder 64 when the fuel-air ratio is decreasing and the signal from derivative device 67 does not reach the adder when the engine is accelerating. If it were considered satisfactory to have the same compensation for both acceleration and deceleration, a single derivative device such as 67 could be connected directly to the adder 64 without the gate and the other derivative device and gate could be omitted. The acceleration derivative signal is instrumental in avoiding $NO_x$ peaks and the deceleration derivative signal in avoiding lean blowouts during speed transients.

The compensated TIT signal is fed to an adder 71 in which the signal of burner inlet temperature from sensor 27 is subtracted from the compensated TIT signal. The result is a signal of burner temperature rise $\Delta T_B$ which is fed through a channel 74 into a dividing device or circuit 75. Here this signal is divided by the flame temperature rise signal, the generation of which will be described, to arrive at the signal of ratio of primary to total air fed through a channel 76 into a function generator 78. This function generator translates the primary to total air ratio signal into a signal of desired burner variable geometry position. The nature of this function is simply a matter of the curve of ratio of primary to total air plotted against the position of the burner variable geometry, which can be determined by measurement and which can be altered by reshaping of the ports or throttling sleeves in the combustion apparatus.

The desired burner variable geometry signal on channel 79 is fed back to a flame temperature scheduling function generator 80. This generates the curve 43 illustrated in FIG. 2 which, as described above, represents the desired schedule of flame temperature as a function of burner variable geometry and therefore of residence time and other factors in the combustion apparatus.

Another factor that enters into the determination of desired flame temperature is a compensation for burner inlet temperature. In other words, instead of simply subtracting the burner inlet temperature from the flame temperature schedule to arrive at the temperature rise in the combustion zone, a compensation factor is fed in. The reason for this is that it has been found in a regenerative engine that there is a tendency to high emissions of carbon monoxide and of occasional lean blowouts during the period of warm-up of the regenerator after starting. If the regenerator is cold, the air fed to the combustion apparatus is much colder (on the order of 500°C. colder) than when the engine is in normal operation after the regenerator has been heated. For this reason, an input of actual burner inlet temperature is fed to a function generator 82 which provides an output signal which in the particular case is constant at about 600°C. up to about 260°C. BIT and then generally linearly drops to zero at about 600°C. BIT. This compensating signal is added to the flame temperature schedule signal in an adder 83 the output of which is a desired flame temperature signal in a channel 84. The result of the compensation is to call for a higher flame temperature when the regenerator is cold. The call for higher flame temperature results in flow of less primary air to the combustion zone.

The flame temperature rise signal is derived from the desired flame temperature by subtracting BIT from it in an adder 86. The resulting signal is the divisor supplied to the dividing device 75 to generate the signal of ratio of primary to total air previously referred to.

This completes the description of the normal circuit for controlling the burner variable geometry and thus the split between primary and secondary air. In a particular engine it was found, however, that better starting conditions were arrived at by limiting the burner variable geometry setting to limit the ratio of primary to total air for a time during cranking or starting of the engine. This is accomplished by putting a temporary limit on the signal transmitted from line 79 into the burner variable geometry actuator 35. This is accomplished by a connection from the starter or starter energizing circuits 19 into a timer 87. For a time after starting this timer generates a signal of maximum burner variable geometry which is transmitted through a channel 88 into a Low Wins gate 90 which also receives the desired burner variable geometry signal from channel 79. After this limited time, which may be of the order of 25 seconds, the timer signal rises above the maximum burner variable geometry so that the signal from function generator 78 takes over control of actuator 35 of the burner variable geometry.

The system as described above schedules flame temperature as a function of BIT and BVG. It should be pointed out that other parameters may be used to schedule flame temperature if so desired. Flame temperature may be related to or scheduled from engine speed, compressor variable geometry, or mass flow over pressure signals.

It will be seen that the burner variable geometry control is a system which may be very simply implemented by standard electronic components to provide the function generators, adders, multiplier, and divider. It can also be implemented mechanically or hydromechanically if desired, as is well known to those skilled in the art of analog computing devices. Calibration of the scales and curve shapes of contol elements is based as usual on engine tests.

It should be apparent to those skilled in the art from the foregoing that my system provides a very simple and responsive system for controlling fuel and burner variable geometry. It requires relatively simple and easily generated input and provides a control which is effective to optimize air split in the combustor and thereby optimize emissions without prejudicing engine response any more than is requisite.

The detailed description of the preferred embodiment of the invention for the purpose of explaining the principles thereof is not to be considered as limiting or restricting the invention, since many modifications may be made by the exercise of skill in the art.

I claim:

1. A control system for a gas turbine gas generator including a combustion apparatus with burner variable geometry (BVG), the system comprising, in combination, means operative to derive a fuel-air ratio signal; means responsive to the difference between turbine inlet temperature and burner inlet temperature (BIT) effective to generate a burner temperature rise signal; means effective to generate a flame temperature rise signal responsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; and actuating means responsive to the BVG signal operative to control burner variable geometry.

2. A control system for a gas turbine gas generator including a combustion apparatus with burner variable geometry (BVG), the system comprising, in combination, means operative to derive a fuel-air ratio signal; means responsive to the difference between turbine inlet temperature and burner inlet temperature (BIT) effective to generate a burner temperature rise signal, the last-named means including compensating means responsive to transients in the fuel-air ratio signal; means effective to generate a flame temperature rise signal responsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; and actuating means responsive to the BVG signal operative to control burner variable geometry.

3. A control system for a gas turbine gas generator including a combustion apparatus with burner variable geometry (BVG), the system comprising, in combination, means operative to derive a fuel-air ratio signal; means responsive to the difference between turbine inlet temperature and burner inlet temperature (BIT) effective to generate a burner temperature rise signal; means effective to generate a flame temperature rise signal responsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; actuating means responsive to the BVG signal operative to control burner variable geometry; and means operative to derive the desired flame temperature signal, the last-named means including a first signal generator responsive to burner inlet temperature, a second signal generator responsive to the BVG signal, and means for combining the outputs of the said signal generators.

4. A control system for a gas turbine gas generator including a combustion apparatus with burner variable geometry (BVG), the system comprising, in combination, means operative to derive a fuel-air ratio signal; means responsive to the difference between turbine inlet temperature and burner inlet temperature (BIT) effective to generate a burner temperature rise signal, the last-named means including compensating means responsive to transients in the fuel-air ratio signal; means effective to generate a flame temperature rise signal responsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; actuating means responsive to the BVG signal operative to control burner variable geometry; and means operative to derive the desired flame temperature signal, the last-named means including a first signal generator responsive to BIT, a second signal generator responsive to the BVG signal, and means for combining the outputs of the said signal generators.

5. A control system for a gas turbine gas generator including a combustion apparatus with burner variable geometry (BVG), the system comprising, in combination, means responsive to gas generator speed operative to derive a scheduled air flow signal; means responsive to burner inlet temperature (BIT) operative to derive maximum and minimum fuel-air ratio signals, means responsive to gas generator speed and a gas generator speed request operative to derive a governor fuel-air ratio signal, and means responsive to the three said fuel-air ratio signals operative to derive a desired fuel-air ratio signal; multiplier means responsive to the air flow and desired fuel-air ratio signals effective to derive a fuel flow signal; fuel control means responsive to the fuel flow signal operative to control fuel flow to the combustion apparatus; means responsive to the difference between turbine inlet temperature and BIT effective to generate a burner temperature rise signal, the last-named means including compensating means responsive to transients in the desired fuel-air ratio signal; means effective to generate a flame temperature rise signal reponsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; actuating means responsive to the BVG signal operative to control burner variable geometry; and means operative to derive the desired flame temperature signal, the last-named means including a first signal generator responsive to BIT, a second signal generator responsive to the BVG signal, and means for combining the outputs of the said signal generators.

6. A control system for a gas turbine gas generator including a combustion apparatus with burner variable geometry (BVG), the system comprising, in combination, means responsive to gas generator speed operative to derive a scheduled air flow signal; means responsive to burner inlet temperature (BIT) operative to derive maximum and minimum fuel-air ratio signals, means responsive to gas generator speed and a gas generator speed request operative to derive a governor fuel-air ratio signal, and means responsive to the three said fuel-air ratio signals operative to derive a desired fuel-air ratio signal; multiplier means responsive to the air flow and desired fuel-air ratio signals effective to derive a fuel flow signal; fuel control means responsive to the fuel flow signal operative to control fuel flow to the combustion apparatus; means responsive to the difference between turbine inlet temperature and BIT effective to generate a burner temperature rise signal, the last-named means including compensating means responsive to transients in the desired fuel-air ratio signal; means effective to generate a flame temperature rise signal responsive to the difference between a signal of the desired flame temperature and BIT; means effective to generate a signal of the desired ratio of primary air flow to total air flow by dividing the burner temperature rise signal by the flame temperature rise signal; means responsive to the said desired air flow ratio signal operative to derive a BVG signal; and actuating means responsive to the BVG signal operative to control burner variable geometry.

* * * * *